Sept. 12, 1933.     C. J. BRISTOL     1,926,368
AUXILIARY TRACK DEVICE FOR AUTOMOBILE LIFTS
Filed Dec. 15, 1930

Inventor
Cyrus J. Bristol
by Orwig & Hager Attys

Patented Sept. 12, 1933

1,926,368

UNITED STATES PATENT OFFICE 1,926,368

AUXILIARY TRACK DEVICE FOR AUTOMOBILE LIFTS

Cyrus J. Bristol, Des Moines, Iowa, assignor to Globe Machinery & Supply Company, Des Moines, Iowa, a corporation of Iowa Application December 15, 1930
Serial No. 502,434

1 Claim. (Cl. 254—89)

The object of this invention is to provide in connection with automobile lifts, of that type having a pair of parallel track members for supporting the wheels of an automobile, improved means whereby automobiles other than those of standard tread may be elevated.

More specifically it is the object of my invention to provide a simple, durable and inexpensive auxiliary track member which may be easily and quickly attached to or detached from the track member of the ordinary automobile lift, and when so attached, to provide means whereby the standard automobile lift may accommodate automobiles other than those of standard tread.

This invention consists in the construction, arrangement and combination of the various parts of the device, whereby the objects contemplated are attained, as hereinafter more fully set forth, pointed out in my claim, and illustrated in the accompanying drawing, in which:

Figure 1:
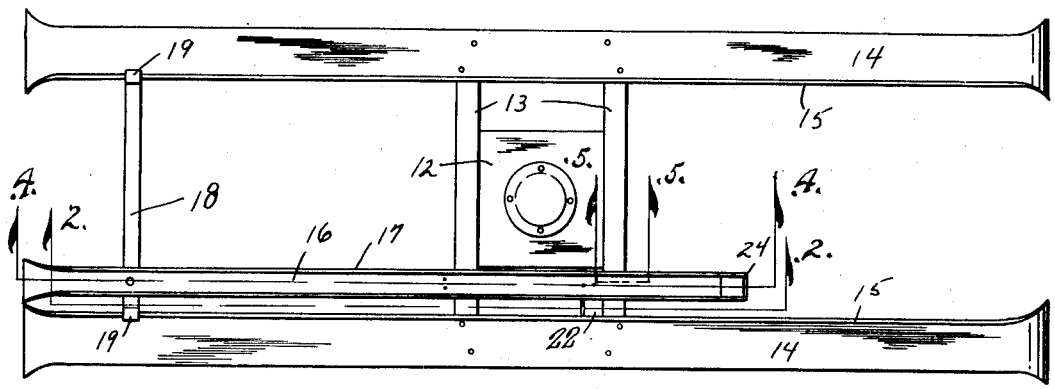
Figure 1 is a plan view of an automobile lift showing my device applied thereto.

Referring to the accompanying drawing, I have used the reference numeral 10 to indicate the upper end of a lift cylinder of the hydraulic type, said cylinder being provided with a vertically and slidably mounted lift rod 11, having a lift head 12 on its upper end. Secured to the head 12 is a pair of transversely arranged beams 13 to which the track members 14 are connected. Said track members have an upwardly extending flange on their inner edge. The track members are spaced apart to accommodate automobiles of standard tread.

It sometimes happens that it is desirable to service the smaller types of automobiles having narrow treads. To accomplish this I have provided an auxiliary tread member 16 comprising a channel bar having upwardly projecting flanges 17. The forward end of the auxiliary tread 16 is supported on a bar 18 having hook portions 19 formed on each end. Said hook portions are designed to rest on the upper edges of the flanges 14 near the forward end of said flange.

Figure 2:
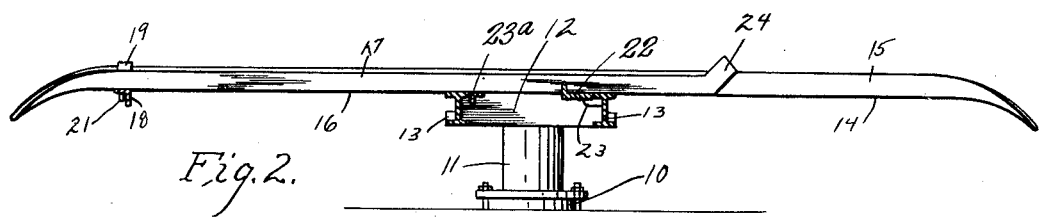
Figure 2 is a detail sectional view taken on the line 2—2 of Figure 1.
Figure 3:
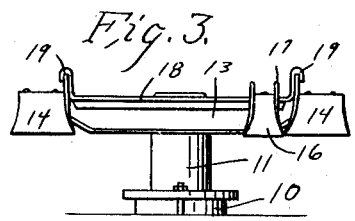
Figure 3 is an end elevation of an automobile lift with my improved device applied thereto.
Figure 5:
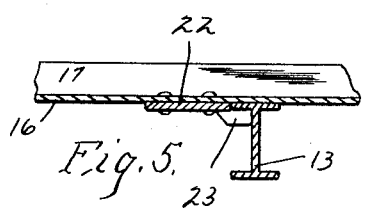
Figure 5 is a detail sectional view taken on the line 5—5 of Figure 1.
Figure 4:
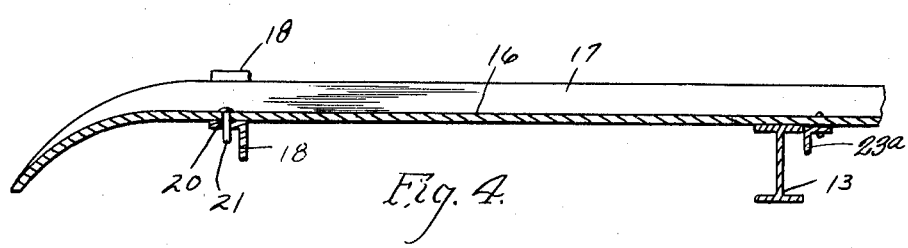
Figure 4 is a detail sectional view taken on the line 4—4 of Figure 1.

The member 18 is provided with an opening 20 for receiving a pin 21 projecting downwardly from the bottom surface of the track member 16. Said pins prevent lateral movement of the forward end of the member 16. The rear ends of the track members 16 are designed to rest on the transverse bars 13. The under surface of the track member 16 is provided with a bracket 22 having a downwardly and rearwardly extending hook portion 23 designed to engage the under surface of the forward edge of the rear cross member 13. The under surface of the member 16 is also provided with a lug 23a designed to rest against the rear edge of the forward cross member 13 in the manner clearly illustrated in Figure 2.

By this arrangement it will be seen that the track member 16 may be easily and quickly attached or detached, said member 16 being attached by simply placing the rear end of the track 16 on the upper edge of the rear cross member 13, with the hook member 23 in position to be moved beneath the upper flange of said cross member, and at the same time supporting the said track member in an upwardly and forwardly inclined position. The track member is then moved rearwardly to move the hook 23 beneath the flange of the member 13. The forward end is then lowered, permitting the lug 23a to move into engagement with the rear edge of the forward cross member 13, and the pin 21 to enter the opening 20 of the member 18. The member 18 is also detachably supported on the forward end of the track members 14 to permit free space between the forward ends of said track members on which workmen may stand while servicing standard tread automobiles.

The rear end of the auxiliary track member 16 is provided with an upwardly and rearwardly extending portion 24 which acts as a stop for limiting the rearward movement of the automobile when moved thereon.

By this arrangement it will be seen that the tread member 16 may be spaced such a distance from one of the tread members 14 as to accommodate automobiles of narrow tread.

The bracket 22 is of such width that its inner end will engage the lift head 12 and its outer edge the adjacent track member 14, thereby providing means for supporting the rear end of the auxiliary track member against lateral movement. The outer end of the member 22 is bent upwardly to engage said track member.

Thus it will be seen that I have provided a simple, durable and inexpensive attachment which may be easily and quickly applied to the standard automobile lifts, and when so applied will accommodate automobiles of narrow tread, and at the same time provides means whereby the auxiliary attachment may be easily and quickly attached or removed at the will of the operator.

I claim as my invention:

An auxiliary track attachment for automobile lifts comprising a track member, a cross beam fixed to one end of said track member, each end of said cross beam having an upwardly extending portion, the free end of which terminates in a downwardly extending portion to form a hook, said hooks being designed to rest on longitudinally extending track flanges of an automobile lift, the under surface of the opposite end of said auxiliary track member having a hook member and a stop for engaging transversely arranged track supporting members of said automobile lift, whereby said auxiliary track member may be easily and quickly attached to an automobile lift and supported parallel with one of the track members of said automobile lift so that said auxiliary track member and one of the track members of said lift may be utilized to support the wheels of a narrow gauge automobile.

CYRUS J. BRISTOL.